Oct. 13, 1959  O. A. ITRIA ET AL  2,908,342
METHOD OF GEOPHYSICAL EXPLORATION
Filed April 19, 1954  4 Sheets-Sheet 1

Oct. 13, 1959     O. A. ITRIA ET AL     2,908,342

METHOD OF GEOPHYSICAL EXPLORATION

Filed April 19, 1954     4 Sheets-Sheet 2

United States Patent Office 2,908,342
Patented Oct. 13, 1959

2,908,342

METHOD OF GEOPHYSICAL EXPLORATION

Oswald A. Itria, Bellaire, and Burton D. Lee, Houston, Tex., assignors to Texaco Inc., a corporation of Delaware Application April 19, 1954, Serial No. 424,200

12 Claims. (Cl. 181—.5)

This invention relates to geophysical exploration. More particularly this invention relates to an improved method of geophysical exploration employing seismic waves.

In seismic reflection surveying the depths of underlying reflecting geological formations are determined by measuring the time intervals elapsed between the generation and reception of seismic waves which have been artificially created, such as by exploding a charge of explosive beneath the surface of the earth.

In reflection seismic surveying as it is usually practiced, a charge of explosive is set off at a point beneath the earth surface known as the shot point. The shot point is most frequently located beneath the low velocity layer or so-called weathered layer which is an unconsolidated and aerated formation and exhibits seismic wave velocities of less than 5,000 feet per second, frequently less than about 2,000 feet per second. After the explosion the seismic waves emanating from the shot point and after having been reflected by the underlying sub-strata are picked up by geophones. The geophones used to detect the reflected seismic waves are arrayed in any desired fashion, depending upon local conditions and the type of information desired, usually in line with the shot point and at or near the earth surface and spaced from the shot point and from each other.

These geophones are devices which are provided with means for converting the mechanical vibrations imparted to the earth by the seismic waves into electrical impulses. It is mentioned that the high frequency components of the seismic waves tend to be more quickly absorbed by the geological formations than the low frequency components. The low frequency components of the seismic waves however, i.e., 20 cycles or less, are more often associated with the so-called clutter or surface travelling waves and random noise not connected with the explosion or shot. Detection of the surface travelling waves and the random noise by the geophones is generally undesirable.

Each geophone is connected to a suitable electrical amplifying circuit and recording system. The utilization of the seismic records so produced to obtain information on the underlying geological strata in the area being explored is based on the fact that part of the seismic wave created by the explosion at the shot point travels downwardly into the earth and is reflected back to the geophones by the various geological formations or strata. By observing the resulting record the existence, location and attitude of the underlying reflecting subsurface formations can be determined.

The detection and identification of the reflected seismic waves are difficult in the presence of the clutter and noise picked up by the geophones. Additional factors complicating the identification of the reflected seismic waves and the interpretation of the seismic records are the influences exhibited by the varying physical characteristics of the underlying geological formations upon the created seismic wave. Depending upon the acoustical contrast between adjacent underlying formations the reflected seismic waves will vary in strength.

Techniques have been proposed for increasing the strength of the reflected seismic wave so that it may more readily be detected and identified on the seismic record, see U.S. Patents 1,998,412; 2,556,299; 2,601,522 and 2,609,885. In general, it has been proposed to create a strong, substantially unidirectional downward seismic wave which, when reflected by the underlying geological formation and detected by the geophones, will be of sufficient strength as to be readily identified on the seismic record. For example, it has been proposed to explode downwardly in a shot hole a continuous spiral length of explosive at a velocity equal to the seismic velocity in the formation of the shot hole so that as the seismic wave propagates downwardly its strength is increased. Indicative of the lack of success of these proposed techniques is the fact that these techniques have not been widely employed by those engaged in seismic exploration.

The above-referred techniques however have ignored the effect of the resulting initially upward moving seismic wave upon the seismic record. It has been found that this initially upwardly moving seismic wave exerts a significant effect upon the resulting seismic record and is capable of giving rise to ambiguous, deceptive, and in some cases practically useless seismic records. The upward moving seismic wave is in many cases critical in its relationship to the downward moving seismic wave to produce an accurate and useful seismic record because of the fact that the upward moving seismic wave is reflected from an overlying horizon such as the air-ground interface (surface) or from the bottom of the low velocity layer, if the shot hole is positioned therebelow. The reflection coefficient of the overlying horizon is very nearly unity at the air-ground interface and in other cases may be significant so that strength or amplitude of the downward reflected wave therefrom, hereinafter sometimes referred to as the "ghost" wave, is substantially as great as the upward moving direct wave from which it was derived. This downward moving reflected or ghost wave is then reflected upward by the underlying geological formations to the geophones. As a result the geophones receive and detect not only the reflected direct wave but also the doubly reflected wave resulting from the initially upward moving wave. The time interval between the direct reflected wave and the ghost reflected wave is equal to twice the travel time of the seismic wave from the point of explosion to the overlying reflecting horizon.

In the practice of the reflection method of seismic exploration many areas have been encountered in which the character and information to be derived from the seismic record is particularly dependent upon the depth at which the explosive charge is detonated. For example, even though all charges have been detonated below the weathered low velocity layer the resulting seismic records obtained from charges fired at depths differing as little as 10 feet have shown serious complicating differences in character. These differences are sometimes so pronounced as to defy correlation between two seismic records from the same shot hole. If records from the same shot hole cannot be correlated it is obvious that records from successive shot holes along a line of survey must also be difficult or impossible to correlate and must produce inaccuracies in interpretation.

Explanatory of the apparent critical shot hole depth and its pronounced effect upon the seismic record we have determined that on the seismic record there are indicated two seismic waves, the direction reflected wave and the ghost reflected wave which in a single shot explosion trails the direct reflected wave by twice the time required for the seismic wave to travel from the point of the explosion to the upper reflecting surface giving rise to the ghost reflected wave. It is apparent therefore that the seismic record resulting from this condition is actually an interference pattern. Remembering that the delayed ghost reflected wave may have essentially the same amplitude as the direct reflected wave it is not difficult to see that a change of shot hole depth, with its consequent change of time delay between the two waves, can make a radical change in the resulting seismic record depending upon the time-phase relationship between these two waves. In effect, the ghost wave may so change the character of the direct reflected wave as to render it unrecognizable. Additionally the ghost wave, depending upon its time-phase relationship with a subsequent direct reflected wave, may so interact with this subsequent wave as to produce an erroneous record by augmentation, cancellation or phase shift.

Accordingly, it is an object of this invention to provide an improved method of seismic exploration.

It is another object of this invention to provide a method of seismic exploration whereby an improved seismic record is obtained.

It is another object of this invention to provide a method of seismic exploration whereby an augmented reinforced initially downward directed seismic wave is reflected to produce a strong signal on the seismic record and a plurality of initially upward directed seismic waves is reflected whereby said upward directed seismic waves are substantially cancelled out on the seismic record.

It is another object of the invention to provide a method of seismic exploration whereby an augmented reinforced initially upward directed seismic wave is reflected to produce a strong signal on the seismic record and a plurality of initially downward directed seismic waves is reflected whereby said downward directed seismic waves are substantially cancelled out on the seismic record.

It is still another object of this invention to provide a method of seismic exploration wherein a plurality of spaced explosive charges are detonated at a velocity substantially equal to the seismic velocity at the location of detonation to provide an augmented reinforced seismic wave in one direction and a plurality of lesser seismic waves in another direction, said explosive charges being spaced from each other so that when the resulting seismic waves which travel in said other direction are received by a geophone they tend to substantially cancel each other.

These and other objects of this invention and how they are accomplished will become apparent in the light of the accompanying disclosure and drawing wherein.

We have discovered that an improved method of seismic exploration is provided to produce a strong reinforced seismic wave in a desired direction and a plurality of less strong seismic waves in another direction, such as in the opposite direction, which substantially cancel each other out on a seismic record, by positioning a plurality of spaced apart explosive charges along a selected position, such as within a shot hole, and progressively detonating each charge in succession so that each charge when detonated contributes to and augments a seismic wave moving in one direction and the resulting plurality of lesser seismic waves moving in another direction, such as the opposite direction, are spaced in time relative to each other or out of phase so that these resulting lesser seismic waves substantially cancel each other. The rate at which the plurality of spaced explosive charges is detonated to produce a reinforced seismic wave in the desired direction, such as up or down, is controlled by the seismic velocity or speed of sound in the medium or formation surrounding the spaced charges. Accordingly, assuming an initial detonation which creates an initial seismic wave, the next detonation takes place when the initial wave reaches the charge adjacent the initially detonated charge. As a result of the in-phase relationship at that instant of the initial seismic wave and the seismic wave created by the detonation of the adjacent charge, there is produced a resultant seismic wave which has a substantially increased strength or amplitude. Accordingly, assuming N separate charges of equal weight are so detonated, the final resulting reinforced seismic wave will have an amplitude substantially N times that of the initial seismic wave, i.e., be multiplied by a factor having the value N.

At the same time a reinforced seismic wave is being produced in the desired direction as each separate detonation takes place, a plurality or series of lesser seismic waves moving in another direction is produced. Since in accordance with this invention it is desired that these lesser seismic waves should cancel each other it is necessary that the time-phase relation of these seismic waves moving in the other direction be such that this result be accomplished. Accordingly the spacing or time delay between each separate detonation is regulated and controlled so that the summation of the several seismic waves moving in said other direction is such as to result in substantial cancellation thereof on the seismic record.

Figure 1:
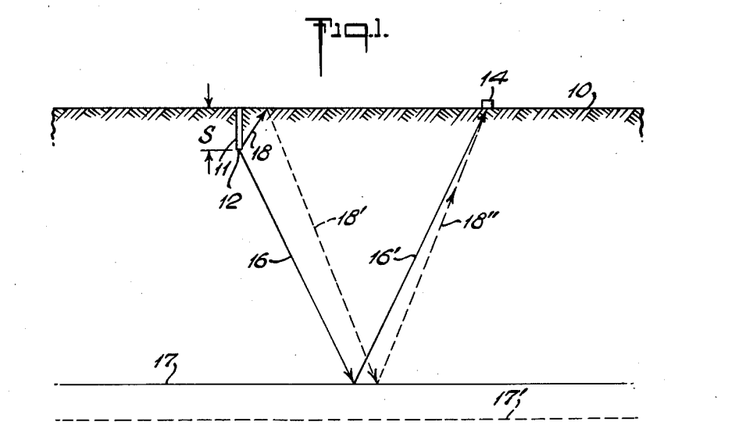
Fig. 1 is a diagrammatic sketch showing the paths of various seismic waves which are received by a geophone.

Referring now to Fig. 1 of the drawing, the surface of the earth is shown at 10. Into the earth there is provided a shot hole 11 which extends beneath the surface 10 a distance S. Usually, in seismic exploration by the reflection method a charge of high explosive is detonated at point 12. A seismic wave is created by the resulting explosion and travels outwardly in all directions from point 12. A geophone 14 located on the surface 10 some distance from the shot hole 11 receives and detects the seismic waves generated by the explosion. The seismic waves received and detected by the geophone 14 include the reflected wave moving along the path 16' which wave was created by the reflection of the seismic wave created at shot point 12 and moving along the path 16 and striking the subsurface reflecting horizon 17. The seismic wave indicated by the combined wave paths 16—16' may be referred to as the direct reflected wave. Also included is the initially upwardly directed seismic wave which moves along the path 18 until it hits some overlying reflecting horizon such as the air-ground interface 10 or the bottom of the weathered or low velocity layer. Upon reaching the surface 10 a substantial part of the seismic wave travelling along the path 18 is reflected back into the earth along the path indicated by the dashed line 18'. This reflected wave 18' in turn is in part reflected by the subsurface reflecting horizon 17 back to the geophone 14 along the path 18". The seismic wave indicated by the combined wave paths 18—18'—18" may be referred to as the ghost reflected wave or the ghost wave.

It is apparent from Fig. 1 that the ghost reflected wave will trail the direct reflected wave at the geophone by about the time interval given by the formula $$\Delta t = \frac{2S}{V}$$

where $\Delta t$ is the time delay between the direct reflected and ghost waves in seconds, S is the distance in feet from the point of explosion to some overlying reflecting horizon such as the air-ground interface and V is the average velocity in feet per second of the seismic wave as it traverses the distance S.

Depending upon the value of the time interval $\Delta t$ the spacing on the seismic record between the direct reflected wave and the ghost reflected wave may be such as to give rise to an interpretation that two subsurface reflecting horizons 17 and 17' are present. Also, the time interval may be such that the direct reflected wave is interfered with by the ghost wave as to be unrecognizable on the seismic record.

Figure 2:
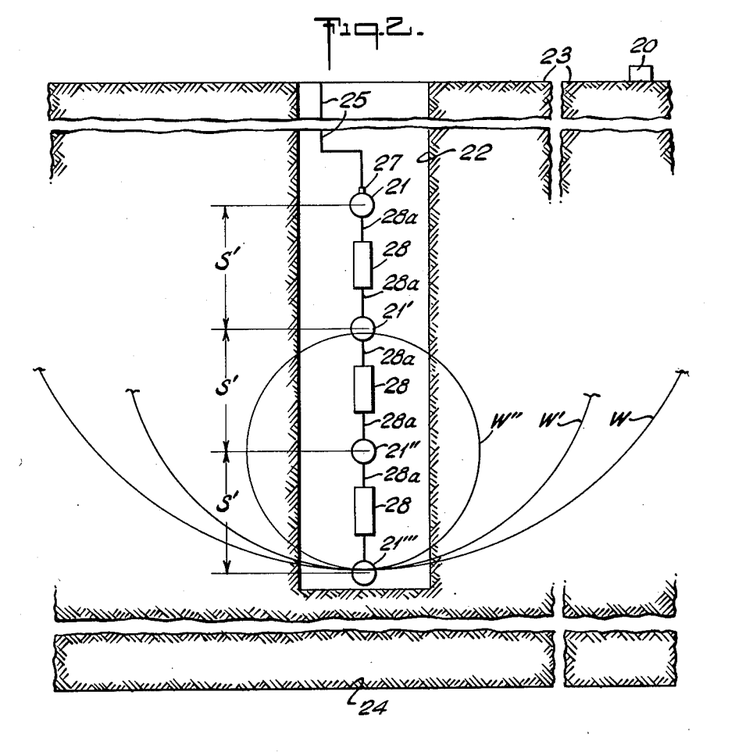
Fig. 2 is a diagrammatic view of a vertical section of the earth showing the wave front of a plurality of seismic waves at a given instant and is illustrative of one embodiment in the practice of our invention.

Referring now to Fig. 2 of the drawing which illustrates one embodiment of the practice of our invention, there is illustrated a plurality of vertically spaced explosive charges, 21, 21' 21" and 21''', which are suitably positioned in a shot hole 22. An upper reflecting horizon and a lower reflecting horizon are indicated by the reference numerals 23 and 24, respectively. A geophone 20 is shown positioned spaced apart from the shot hole 22 by a suitable distance. Charge 21 is connected to blasting wire 25 which at its upper end is connected to a voltage source such as a battery or blasting machine, not shown. The other end of the blasting wire 25 is connected to electric blasting cap 27 which serves to detonate charge 21. Suitable explosive time delay elements interconnect charges 21—21', 21'—21" and 21" and 21''' and serve to transmit the detonation wave from one charge to another. These time delay elements may comprise lengths 28a of Primacord which has a detonation velocity in the neighborhood of 20,000 ft. per sec. interconnected by means of one or more explosive time delay units 28 which are available for various time delays, such as 0.001 sec., 0.002 sec., 0.0025 sec., 0.003 sec., etc. Depending upon the desired time delays between successive charges, a suitable number or type of time delay unit is employed. Other suitable methods of obtaining the desired time delay between successive detonations may be used.

When the firing voltage is applied to wire 25 the blasting cap 27 is fired and the explosive charge 21 is detonated. The detonation wave resulting from the firing of charge 21 is transmitted along the Primacord 28a through the explosive time delay unit 28 and thence by means of additional Primacord to charge 21'. In a like manner charges 21" and 21''' are subsequently detonated.

In the embodiment illustrated in Fig. 2 it is desired to produce a strong reinforced downwardly directed seismic wave. This is accomplished in the manner to be described. Explosive charge 21 is the first to be detonated. With the detonation of charge 21 a seismic wave is created and travels outwardly in all directions from the charge. Of particular interest in the practice of this embodiment of our invention are the substantially downward directed portion and the substantially upward directed portion of the seismic wave. The seismic wave created by the detonation of charge 21 will move outwardly at a velocity equal to the seismic velocity in the formation or medium surrounding the charge 21.

The seismic velocity of the medium surrounding the shot and through which the seismic wave travels can be determined by various methods. One convenient method of determining the seismic velocity involves positioning a number of spaced apart geophones along the length of the shot hole. An explosive charge is then detonated at the top of the shot hole slightly off to one side. The time of arrival of the seismic wave at each of the geophones is then measured and from this information, knowing the distance of each geophone from the exploded charge, it is a relatively simple matter to calculate the velocity of the seismic wave as it travels down through the formation surrounding the shot hole to the geophones.

Knowing the effective seismic velocity and the distance separating each of the spaced charges, the time delay between the detonation of each of the spaced charges can be calculated so that the detonation of each charge takes place at substantially the instant the downward moving seismic wave reaches each charge. For example, assuming a seismic velocity of 5,000 feet per second and a charge spacing of 10 feet a time delay of .002 second between the charges is required in order to reinforce the seismic wave in the downward direction.

When the charges 21, 21', 21" and 21''' are fired in the above indicated manner a strong, reinforced downward wave is produced. This reinforced seismic wave is approximately four times as strong as the initial seismic wave created by the detonation of the charge 21 since the phase relationship of each newly created seismic wave with respect to the downward moving seismic wave is such as to augment each other.

It is to be observed however, as indicated in Fig. 2 which illustrates the position of the seismic wave fronts W, W' and W", resulting from the detonation of charges 21, 21' and 21", respectively, at the instant charge 21''' is detonated, that since each detonation creates a seismic wave which moves radially outward in all directions, each detonation also creates an upward directed seismic wave which moves in substantially the opposite direction to the reinforced downward directed seismic wave. These individual upward directed seismic waves, however, will not be in time-phase coincidence. Actually as indicated in Fig. 2, the time interval $\Delta T$ between each upward directed seismic wave front will be substantially equal to twice the distance $S'$ separating each spaced charge divided by the seismic velocity $V_f$ of the formation in which the wave is travelling, as given by the equation $$T = \frac{2S'}{V_f}$$

The distances $S'$ separating each of the spaced charges may not be the same depending upon the seismic velocities of the formations traversed by the shot hole.

In the practice of this invention it is desirable that the time-phase relationship of these individual initally upward directed siesmic waves be such that, when received and detected by the geophone 20 as the ghost reflected waves and translated to a seismic record, these individual seismic waves substantially cancel each other. This desired mutually cancelling time-phase relationship of the individual upward moving seismic waves is obtained by spacing the individual explosive charges relative to each other so that at the instant of detonation each upward seismic wave created at that instant is substantially out of phase with respect to its preceding upward directed seismic wave so that when these waves are received and recorded, mutual cancellation thereof on the seismic record is obtained.

Figure 3:
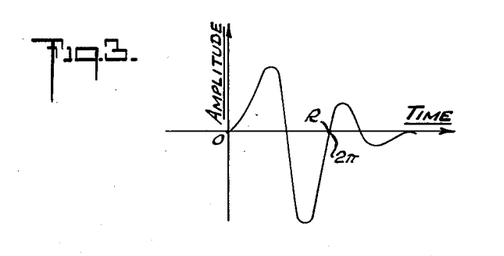
Fig. 3 is an idealized trace of a seismic wave as recorded on a seismic record.

Referring now to Fig. 3 of the drawing there is schematically illustrated a record or trace of a seismic wave as might be observed near the point of a single explosion. As is apparent from an inspection of Fig. 3, such a record is not a single wave form of one frequency but rather comprises components of various frequencies. The higher frequency components of a seismic wave are rather quickly attenuated by the earth as the wave travels therethrough. The very low frequency components of a seismic wave, i.e., lower than 20 cycles per second, are generally rejected in the recording system. This is desirable because the surface waves created by the explosion are made up principally of low frequency components and if detected would produce a cluttered seismic record difficult to interpret. In general those seismic waves of interest to the geologist and geophysicists are those waves having frequencies principally in the range 20–200 cycles per second.

Considering the seismic wave trace illustrated in Fig. 3, it is to be observed that the significant portions of this wave, to which portions substantially all of the character or identifying properties of this wave may be assigned, comprise the initial up-going and down-going portions thereof; i.e., the initial positive and negative portions or excursions of the wave O—R which together may be loosely considered as making up a full wave, as indicated. The remaining trailing portions of the trace are less significant.

It has been observed in the practice of our invention that maximum mutual cancellation of the plurality of separate seismic waves which initially move in the direction substantially opposite from the single reinforced wave, is obtained when charges are so disposed and fired that the onset of a succeeding wave of said separate waves as observed at a fixed point, such as at the geophone, occurs when its preceding wave reaches its first peak value, such as its first maximum positive value or amplitude.

Figure 4:
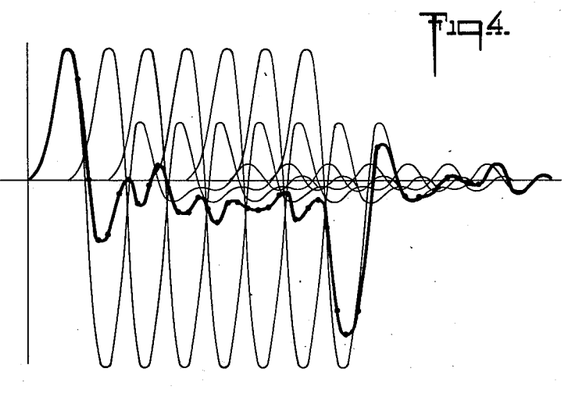
Fig. 4 is an illustration indicative of the practice of our invention wherein a plurality of seismic waves spaced in time relative to each other are substantially cancelled out.

Fig. 4 of the drawing shows how the time-phase relationship of individual seismic waves, for example the initially upward directed individual seismic waves of Fig. 2, can be such as to effectively cancel each other and produce a more intelligible and readable seismic record. In Fig. 4 seven initially upwardly seismic waves, such as may be created in accordance with the method described with respect to Fig. 2, after having been reflected from an overlying reflecting formation or the surface of the earth and then reflected from an underlying reflecting formation and received and detected by a geophone (the ghost reflected waves) are shown as received on a seismic record. These waves when recorded on the record have been substantially cancelled. The individual seismic waves are indicated by the light lines and the resultant recorded seismic wave is indicated by the heavy line. The initial and terminal waves will not be completely cancelled because there are no waves by which they can be so cancelled. However the amplitudes of the uncancelled portions of the initial and terminal waves, as compared with the amplitude of the reinforced wave which is also created in the practice of this invention, is of the order $1/N$ wherein $N$ is number of charges sequentially fired. Accordingly the initial and terminal waves will be submerged in the record due to the comparatively very great amplitude of the reinforced wave which is associated therewith.

The following example is indicative of the practice of this invention. A shot hole is located and bored into a formation having a seismic velocity of 5,000 feet per second as determined by a shot hole velocity profile in the manner indicated hereinabove. It has been observed that the time interval between the onset and the first peak value of a seismic wave created by an explosive charge detonated in the formation traversed by the shot hole and detected by a suitably positioned geophone is of the value 0.006 sec. In order to produce a strong reinforced downward directed wave it was decided to position seven 4 pound charges of explosive vertically spaced within the shot hole. To obtain maximum mutual cancellation of the ghost reflected waves the charges were spaced from each other by a distance equal to the seismic velocity (ft. per sec.) multiplied by one half of the abovementioned observed time, i.e., $$5000 \times \frac{0.006}{2}$$

Accordingly the charges were spaced at a distance of about 15 feet, from each other. The time delay between each successive downward detonation was arranged to be 0.003 second by means of suitable lengths of Primacord and an explosive time delay unit in order that the downward directed seismic wave be reinforced by each successive detonation. It is pointed out that in order for the individual initially upward directed seismic waves to be in time-phase cancelling relationship when detected and recorded, it is necessary to space the individual charges a distance from each other equal to the distance traversed by the seismic wave during the period 0.003 sec. Accordingly when the charges have been so positioned and detonated in the downward direction a strong downward directed seismic wave is created and the ghost reflected waves are substantially cancelled in the manner indicated by Fig. 4 when detected and recorded.

Figure 7:
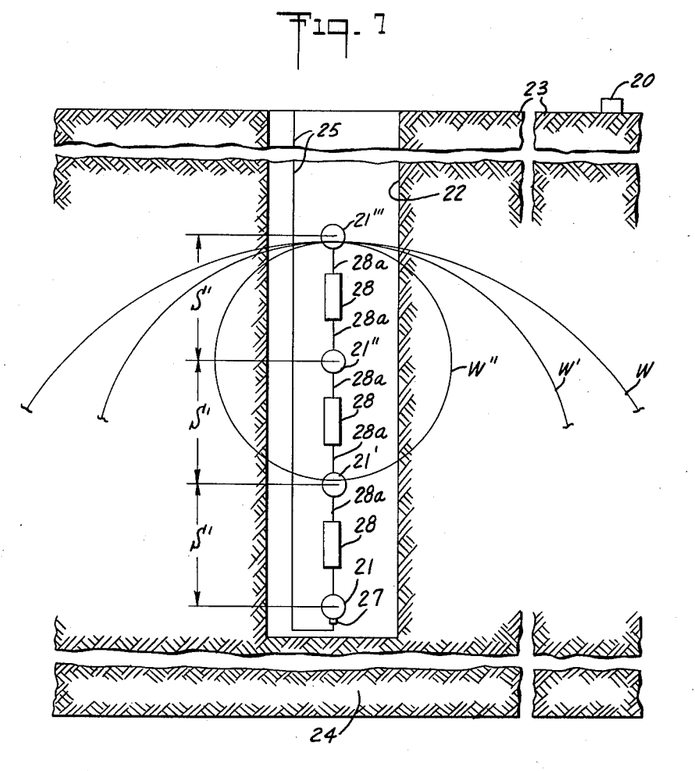
Fig. 7 is a diagrammatic view of a vertical section of the earth, showing the wave front of a plurality of seismic waves at a given instant and is illustrative of another embodiment in the practice of our invention.

Although this invention has been described with reference to a preferred embodiment, i.e., downward sequential shooting described with reference to Fig. 2, it is pointed out that the principles of this invention are equally applicable to upward sequential shooting, i.e., where the initial detonation is started at the bottom of the charge array. Referring again to Fig. 1 it is to be noted that the ghost reflected wave will be recorded on the seismic record at some time later than the direct reflected wave. This same relationship holds true for downward sequential shooting in which the reinforced seismic wave is the direct reflected wave. In upward sequential shooting however the so-called ghost wave will be the reinforced seismic wave and will appear prominently on the seismic record and contain the desired intelligence relative to the underlying subsurface formations, being preceded by the relatively weak substantially concelled direct reflected waves. Upward sequential shooting and its applicability to seismic exploration is illustrated in Fig. 7 which has the same reference numbers applied to the same element as those shown in Fig. 2. Consequently the explanation given above for Fig. 2 applies in the same manner to Fig. 7, and no repetition of this explanation need be given here. It is sufficient to note that the blasting cap 27 and charge 21 of Fig. 7 are located at the bottom of the plurality of charges, so that the reinforced wave moves upward.

Figure 8:
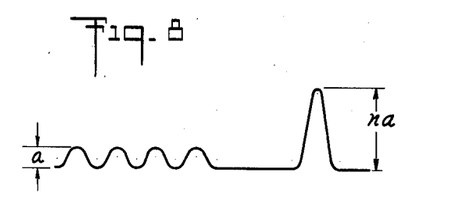
Fig. 8 is a highly schematic illustration of a seismic record which might be obtained in the practice of the foregoing embodiment of our invention.

Referring to Fig. 8 of the drawings, there is schematically illustrated a portion of a seismic record which might be obtained in the practice of the upward direction embodiment of our invention. The separate initially downwardly directed seismic waves of an amplitude "$a$" precede the reinforced initially upwardly directed seismic wave having an amplitude "$na$" wherein $n$ is the number of charges upwardly sequentially detonated. In the embodiment illustrated in Fig. 7, $n$ would have a value of four. As is apparent from Fig. 7 the reinforced seismic wave would follow its immediately preceding seismic wave by a time interval $\Delta T$ where $\Delta T$ is the time interval in seconds in accordance with the equation $$\Delta T = \frac{2Z}{V_f}$$

where $Z$ is the vertical distance in feet between the last sequentially detonated explosive charge and the overlying reflecting horizon, which may be the earth surface or the bottom of the low velocity layer, giving rise to the ghost reflected wave and where $V_f$ is the average seismic velocity over the distance $Z$.

In the practice of our invention it is desirable to employ a number of sequentially detonated charges, preferably at least three, so that the reinforced seismic wave has an amplitude sufficient to overcome and submerge in the seismic record the separate initially oppositely directed seismic waves which are associated in relatively close time relationship with the reinforced wave. A number of spaced charges in the range 4–10 is sufficient. It has also been observed that the length of the charge array, usually dependent on the number of charges employed, increases the directivity of the reinforced wave. The weight of each individual charge in an array is preferably in the range ¼ to 25 pounds, although smaller or larger size charges may be employed depending upon local conditions. As indicated it is preferred to detonate an initial single charge in the area to be explored in order to determine the seismic wave form characteristic of that area. This characteristic seismic wave form can conveniently be determined, if desired, at the same time the seismic velocity of the shot hole formation is determined in the manner described hereinabove. This initial determination of the seismic wave form is not absolutely necessary in the practice of our invention since an excellent approximation of the characteristic seismic wave form can be arrived at based upon prior experience in the area or by empirical methods.

Figure 6:
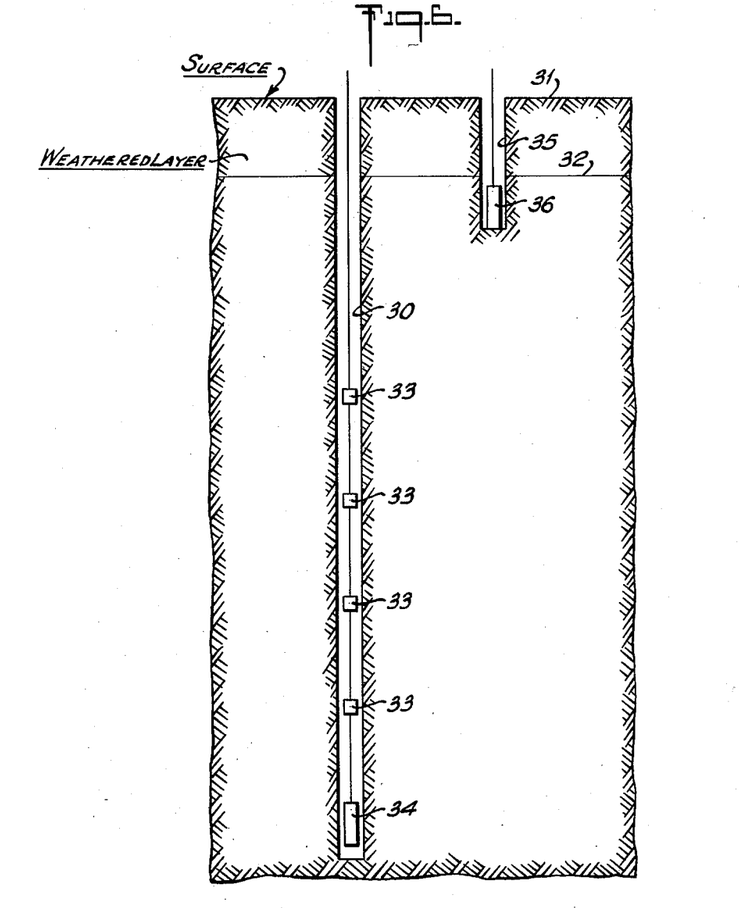
Fig. 6 is a sketch illustrative of a method for determining charge spacing in the practice of our invention.

Referring now to Fig. 6 of the drawing there is diagrammatically illustrated a preferred method for determining charge spacing in the practice of our invention. Advantageously by the illustrated method the seismic velocities of the formations traversed by the bore hole are also obtained, together with the characteristic seismic wave form of the area. From this wave form the charge spacing required to effect ghost wave cancellation is determined. As illustrated in Fig. 6, a shot hole 30 is drilled into the earth. The earth surface is indicated at 31 and the bottom of the so-called weathered or low-velocity layer from which the ghost waves would be reflected is indicated at 32. The shot hole may be 200–300 feet deep, more or less, depending upon the thickness of the weathered layer encountered in the area being explored and the length of the charge array contemplated to be detonated within the shot hole. It is preferred that all the charges to be sequentially detonated be located beneath the weathered layer or the predominant overlying reflecting horizon. It is mentioned that in the Gulf Coast area of the United States the thickness of the weathered layer is about 10–12 feet, more or less, whereas in other areas it may be many times this thickness.

A small charge of high explosive 34 is located about the bottom of shot hole 30. Within shot hole 30 a string of seismic detectors is positioned, such as a number of cylindrical barium titanate detectors 33 spaced a suitable distance apart from each other, such as about 10 feet. In the vicinity of shot hole 30 there is provided a relatively shallow hole 35 which extends through the weathered layer, as illustrated, to penetrate the bottom 32 thereof. A suitable geophone or seismic detector 36 is positioned within the hole 35 just beneath the bottom 32 of the weathered layer. The detector 36 serves to detect and record the form of the initially upward moving seismic wave characteristic of this area when charge 34 is detonated.

Upon detonation of charge 34 the arrival times of the resulting upward moving seismic wave at each of the detectors 33 within shot hole 30 are determined to produce a running record of the velocity of sound through all the formations traversed by the shot hole 30. At the same time the seismic detector 36 serves to detect this seismic wave and record the shape or wave form of the seismic wave at about the bottom 32 of the weathered layer, such as is illustrated in Fig. 3, whereby the time difference between the onset of the wave and the peak of the first wavelet is determined. Knowing this time difference which is determined from the detected wave form the charge spacing of the downward sequentially detonated array can be determined and applied in accordance with our invention so as to effect mutual cancellation of the ghost waves essentially before they are reflected from some overlying reflecting horizon such as the bottom 32 of the weathered layer or the earth surface 31.

Various other methods, other than the method described with respect to Fig. 2 can be employed for sequentially detonating a plurality of spaced charges in the desired time sequence. For example, each charge to be detonated can be provided with an electric blasting cap containing a suitable time delay element, each time delay element being successively greater from one end of the charge array to the other. Accordingly when the firing voltage is simultaneously impressed upon each of the electric caps the detonation of each of the charges is then controlled by the time delay element associated therewith. This technique avoids the use of Primacord to carry the detonation wave from charge to charge. Another suitable method would comprise employing a fuse or detonator associated with each of the spaced charges and responsive to the seismic wave. Each charge would then be exploded at about the instant the seismic wave reaches each charge. Another suitable method particularly applicable to upward sequential shooting is to employ a precision sequence timer to electrically detonate each charge in desired time sequence. In downward firing the firing wires leading to the timer-blaster could be protected from the explosion by being run through a tubing or pipe adjacent the charges detonated.

Figure 5:
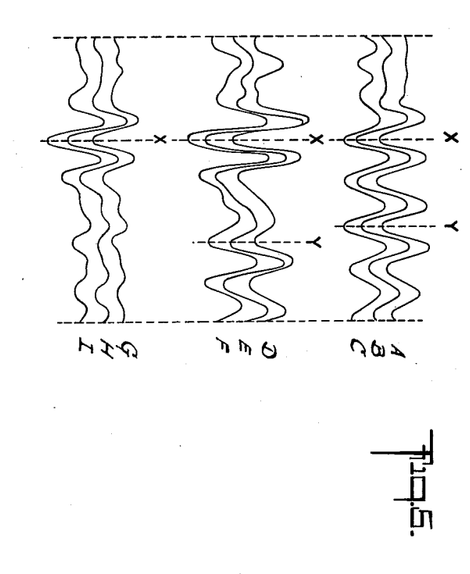
Fig. 5 is an illustration of actual seismic records and indicates an improved seismic record obtained in accordance with the practice of our invention.

Referring now to Fig. 5 of the drawing there are illustrated portions of actual seismic records indicating seismic waves received by three suitably placed geophones. The upper three traces A, B and C are a record of reflected seismic waves created by the detonation of a single 2-pound charge of high explosive at a point 112 feet beneath the surface of the earth at a particular area of survey. The middle three traces D, E and F are a record of reflected seismic waves created by the detonation of a single 10-pound charge of high explosive at a point 137 feet beneath the surface of the earth. The bottom three traces G, H and I are a record of reflected seismic waves created by the downward sequential detonation of four separate ¼-pound charges of high explosive which were spaced apart from each other and sequentially detonated in accordance with the practice of our invention.

By an inspection of Fig. 5 it is apparent to those skilled in the art that the record produced by the traces G, H and I is more readable and easily interpreted. The seismic or reflected wave X clearly stands out on the record. On the traces A, B, C and D, E, F, the reflected seismic wave X is closely associated with the ghost wave Y and as a result records which are difficult to interpret are produced. Note particularly that the ghost wave Y is displaced a greater distance from the direct reflected wave X in the traces D, E, F than in the traces A, B, C since the shot point of traces D, E, F is located a greater distance beneath the surface of the earth and accordingly the ghost wave lags behind the direct reflected wave X a greater extent. In traces G, H, I, however, the time-phase relationship of the ghost waves is such that they substantially completely cancel each other and as a result they do not noticeably appear on the record. The direct reflected seismic wave X, however, is prominent and easily detected.

As will be apparent to those skilled in the art upon reading this disclosure, many modifications, substitutions and changes which do not depart from the spirit or scope of this invention are possible.

We claim:

1. In a method of seismic exploration which includes detonating at least three separate spaced apart explosive charges at a velocity equal to the seismic velocity of the medium associated with said charges so as to produce a reinforced seismic wave moving in one direction in said medium and a plurality of separate lesser seismic waves moving in another direction, the improvement comprising spacing said charges apart at a distance such that the separate seismic waves moving in the opposite direction in said medium will pass a given point in opposite-phase cancelling relation to one another.

2. In a method of seismic exploration which includes detonating at least three separate vertically spaced explosive charges located beneath the surface of the earth at a velocity equal to a seismic velocity of the earth formation traversed by said spaced charges so as to produce a reinforced seismic wave moving in one direction and a plurality of separate lesser seismic waves moving in the opposite direction, the improvement comprising spacing said charges apart at a distance such that the separate seismic waves moving in the opposite direction in said medium will pass a given point in opposite-phase cancelling relation to one another.

3. A method according to claim 2 wherein said reinforced seismic wave initially moves in the downward direction.

4. A method according to claim 2 wherein the number of separate charges is in the range 3–10, inclusive.

5. A method according to claim 2 wherein the weight of each of the separate charges is in the range ¼ to 25 pounds, inclusive.

6. In a method for seismic exploration which includes positioning at least three separate vertically spaced explosive charges beneath the surface of the earth, successively detonating each of said charges at a velocity equal to the seismic velocity of the earth formation traversed by said charges so as to produce a reinforced seismic wave moving in a desired direction and a plurality of spaced apart lesser seismic waves moving in the opposite direction, the improvement comprising spacing said charges apart such that the onset of each succeeding lesser seismic wave will press a given point at about the initial maximum amplitude of its preceding lesser seismic wave.

7. A method according to claim 6 wherein said reinforced seismic wave initially moves in the downward direction.

8. A method of seismic exploration which comprises detonating a trial charge of high explosive beneath the surface of the earth in an area to be explored, detecting and recording the seismic waves characteristic of said area resulting from said detonation whereby the time differential between the onset of one of said waves and its initial maximum amplitude may be determined, positioning a plurality of separate vertically spaced explosive charges beneath the surface of the earth in said area, successively detonating each of said charges at a velocity equal to the seismic velocity of the earth formation traversed by said charges so as to produce a reinforced seismic wave moving in a desired direction and a plurality of lesser seismic waves moving in the opposite direction, and spacing said charges apart from each other prior to the detonation thereof at a distance determined by said time differential so that said lesser seismic waves substantially cancel each other, the spacing between each charge being such that the onset of each succeeding lesser seismic wave as it passes a given point occurs at about the initial maximum amplitude of its preceding seismic wave.

9. A method of seismic exploration which comprises positioning a number of separate vertically spaced explosive charges beneath the surface of the earth, successively detonating each of said charges beginning with the lowermost charge at a velocity equal to the seismic velocity of the earth formation traversed by said charges so as to produce a reinforced seismic wave initially moving in the upward direction and a plurality of separate lesser seismic waves initially moving in the downward direction, and spacing said charges apart at a distance such that the separate seismic waves moving downward will pass a given point in opposite-phase cancelling relation to one another.

10. A method in accordance with claim 9, wherein all of said separate vertically spaced charges are located beneath the bottom of the so-called low velocity or weathered layer of the earth.

11. A method in accordance with claim 10, wherein the number of charges is in the range 3–10, inclusive.

12. A method in accordance with claim 11, wherein each of said separate charges have substantially the same weight.

References Cited in the file of this patent
UNITED STATES PATENTS

| | | |
|---|---|---|
| 1,998,412 | Prescott | Apr. 16, 1935 |
| 2,377,903 | Rieber | June 12, 1945 |
| 2,556,299 | Scott | June 12, 1951 |
| 2,770,312 | Silverman | Nov. 13, 1956 |
| 2,808,894 | Eisler et al. | Oct. 8, 1957 |

OTHER REFERENCES

Schock: "Progressive Detonation of Multiple Charges in a Single Seismic Shot," Geophysics Magazine, vol. XV, No. 2, April 1950, pages 208–218.

UNITED STATES PATENT OFFICE
CERTIFICATE OF CORRECTION

Patent No. 2,908,342                                                              October 13, 1959

Oswald A. Itria et al.

It is hereby certified that error appears in the printed specification of the above numbered patent requiring correction and that the said Letters Patent should read as corrected below.

Column 11, line 22, for "press" read -- pass --.

Signed and sealed this 3rd day of May 1960.

(SEAL)
Attest:

KARL H. AXLINE
Attesting Officer

ROBERT C. WATSON
Commissioner of Patents

UNITED STATES PATENT OFFICE
CERTIFICATE OF CORRECTION

October 13, 1959

Patent No. 2,908,342

Oswald A. Itria et al.

It is hereby certified that error appears in the printed specification of the above numbered patent requiring correction and that the said Letters Patent should read as corrected below.

Column 11, line 22, for "press" read -- pass --.

Signed and sealed this 3rd day of May 1960.

(SEAL)
Attest:

KARL H. AXLINE
Attesting Officer

ROBERT C. WATSON
Commissioner of Patents